(12) United States Patent
Ishikawa

(10) Patent No.: US 7,055,375 B2
(45) Date of Patent: Jun. 6, 2006

(54) LEAKAGE DETECTING APPARATUS FOR AN EXHAUST GAS RE-CIRCULATING SYSTEM OF AN ENGINE

(75) Inventor: Yosuke Ishikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/030,317

(22) Filed: Jan. 7, 2005

(65) Prior Publication Data
US 2005/0161029 A1    Jul. 28, 2005

(30) Foreign Application Priority Data
Jan. 20, 2004    (JP)    ............... 2004-011455

(51) Int. Cl.
*G01M 3/04*    (2006.01)
(52) U.S. Cl. ............... 73/49.7; 73/117.3; 73/117.2; 73/116
(58) Field of Classification Search ............... 73/49.7, 73/117.3, 117.2
See application file for complete search history.

(56) References Cited

U.S. PATENT DOCUMENTS

| | | | | |
|---|---|---|---|---|
| 5,508,926 A | * | 4/1996 | Wade ................... | 701/29 |
| 5,577,484 A | * | 11/1996 | Izutani et al. ............ | 123/568.16 |
| 5,664,548 A | * | 9/1997 | Izutani et al. ............ | 123/568.16 |
| 5,771,869 A | * | 6/1998 | Yoshihara et al. ....... | 123/568.16 |
| 6,024,075 A | * | 2/2000 | Bidner et al. ............ | 123/568.16 |
| 6,941,936 B1 | * | 9/2005 | Yasui et al. ............. | 123/674 |
| 2003/0070667 A1 | * | 4/2003 | Yasui et al. ............. | 123/674 |
| 2003/0089357 A1 | * | 5/2003 | Takizawa et al. ........ | 123/674 |

FOREIGN PATENT DOCUMENTS

JP    3097491    8/2000

* cited by examiner

*Primary Examiner*—Edward Lefkowitz
*Assistant Examiner*—Freddie Kirkland, III
(74) *Attorney, Agent, or Firm*—Arent Fox PLLC

(57) ABSTRACT

A leakage detecting apparatus includes a re-circulating passage for re-circulating an exhaust gas from an exhaust system to an air intake system in the engine, a re-circulating valve disposed in the re-circulating passage to control a flow rate of the re-circulating exhaust gas, and an A/F ratio sensor for detecting an A/F ratio of the exhaust system. An electronic control unit detects an operation amount of the re-circulating valve and calculates correlation between the operation amount and output of the A/F ratio sensor to determine a leakage in the re-circulating passage. The correlation is obtained by an inner product calculation of a vector of deviations of a time-sequence vector of the operation amount relative to a moving average and a vector of deviations of a time-sequence vector of the output of the A/F ratio sensor relative to a moving average. Leakage in the re-circulating passage is detected when an accumulated value of the inner product values over a predetermined period exceeds a threshold value.

4 Claims, 5 Drawing Sheets

LEAKAGE DETECTING APPARATUS FOR AN EXHAUST GAS RE-CIRCULATING SYSTEM OF AN ENGINE

BACKGROUND OF THE INVENTION

The present invention relates to a failure detection for an internal-combustion engine in which exhaust gas recirculation is applied.

Conventionally, an intake air amount into an engine is controlled by returning a part of the exhaust gas to the intake air (this approach is referred to as "exhaust gas recirculation (EGR)"). Since the oxygen density in the intake air decreases when the EGR is applied, a combustion temperature becomes lower, contributing to reduction of the generated NOx emission.

Japanese Patent No. 3097491 discloses a technique for detecting a clogging in a recirculation passage in an engine having an EGR mechanism based on a relation between an engine operating condition and a significance of a pulsation of an output from a pressure sensor disposed in the recirculation passage.

However, this conventional technique cannot detect such leakage failure wherein the outside air flows into the recirculation passage due to occurrence of a crack or a disconnection in the recirculation passage. Under the condition where the leakage is occurring, the exhaust gas containing more external air recirculates into the engine than the re-circulating exhaust gas at no leakage failure time. Therefore, the oxygen density of the intake air becomes higher than normally. When a fuel amount corresponding to the normal recirculation amount is injected under such a condition, the air-fuel ratio becomes lean temporarily, that is, the air-fuel ratio goes out of the optimum range of the catalyst purification rate. As a result, the emission after passing through the catalyst becomes bad.

Accordingly, it is an objective of the present invention to resolve the above-described problem.

SUMMARY OF THE INVENTION

In order to resolve the above-described problem, the present invention provides an apparatus for detecting a leakage of a re-circulating passage. The apparatus has a re-circulating passage for re-circulating an exhaust gas from an exhaust system to an air intake system in an engine, a re-circulating valve that is disposed in the re-circulating passage to control a flow rate of the re-circulating exhaust gas, operation amount detecting means for detecting an operation amount of the re-circulating valve and an A/F ratio sensor for detecting an A/F ratio of the exhaust system. The apparatus further includes means for calculating a correlation between outputs of the operation amount detecting means and outputs of the A/F ratio sensor so as determine a leakage in the re-circulating passage based on the calculated correlation.

According to this invention, the leakage of the re-circulating passage can be determined based on the calculation of the correlation between the outputs of the operation amount detecting means for the re-circulating valve and the outputs of the A/F ratio sensor.

According to one aspect of the present invention, the correlation between the output of the operation amount detecting means for the re-circulating valve and the output of the A/F ratio sensor is obtained by an inner product calculation of (1) deviation vector of a time-sequence vector of the output of the operation amount detecting means relative to an average value of that vector and (2) deviation vector of a time-sequence vector of the output of the A/F ratio sensor relative to an average value of that vector. It is determined that there exists a leakage in the re-circulating passage when an accumulated value of the inner product values over a predetermined period exceeds a threshold value.

According to another aspect of the present invention, the predetermined period for the inner product calculation is a period that a variance of the time-sequence vector of the output of the operation value detecting means, or alternatively a sum of squared values of the deviations of those output relative to the average value, reaches a predetermined value.

DESCRIPTION OF THE PREFERRED EMBODIMENTS

Figure 1:
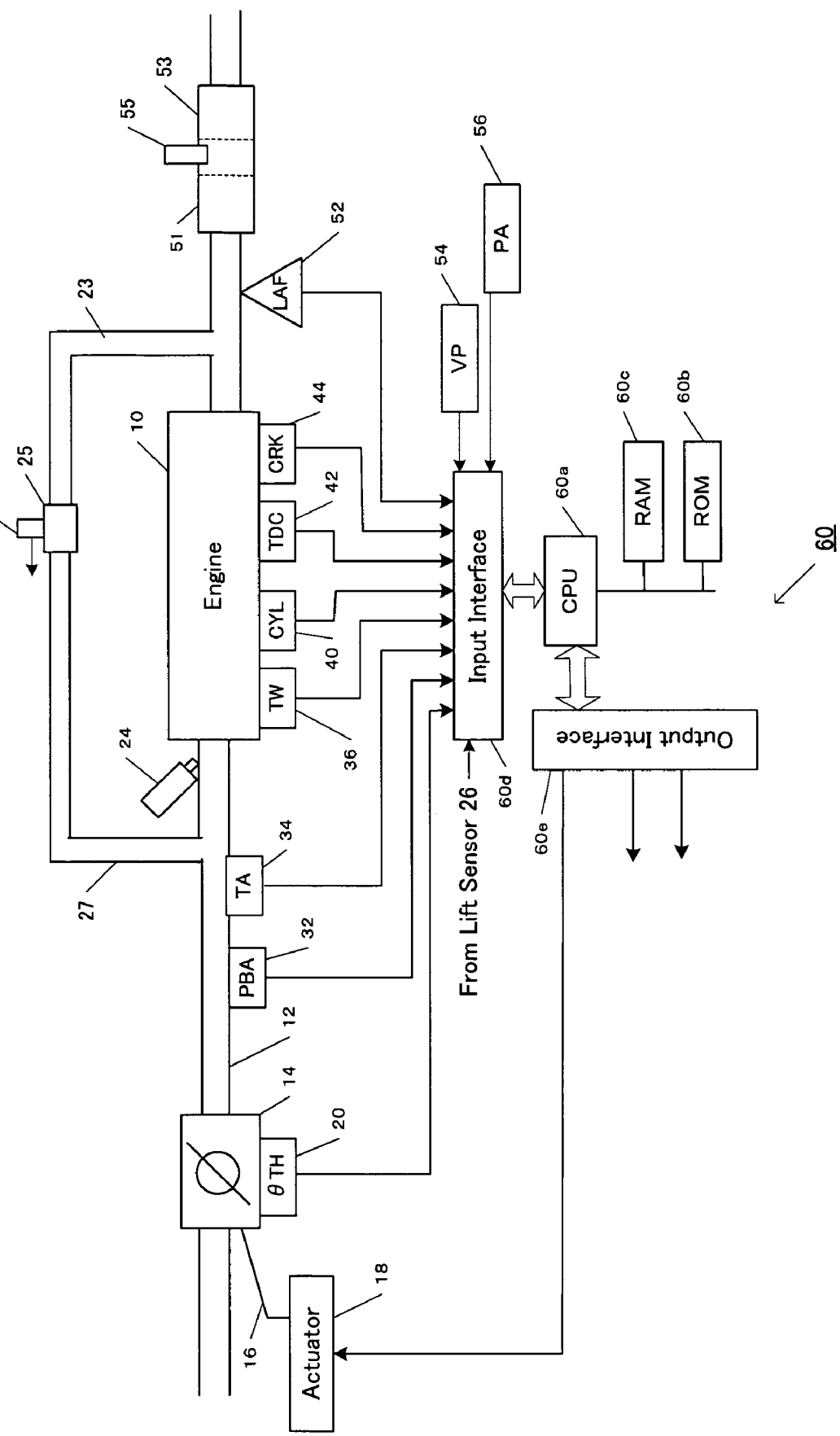
FIG. 1 is a block diagram showing an overall structure of a control system for an engine.

An embodiment of the present invention will be now described with reference to the accompanying drawings. FIG. 1 is a block diagram showing an overall structure of an idle rotational speed control unit for an engine. An engine 10 is, for example, a 4-cylinder automobile engine. A throttle valve 14, which is a main throttle valve, is disposed in an air intake pipe 12. The throttle valve 14 is driven by an actuator 18 in accordance with a control signal from an electronic control unit (ECU) 60. In accordance with a detected output from a depression amount sensor for an accelerator pedal (not shown), the ECU 60 sends a control signal for controlling an opening/closing of the throttle valve 14 to the actuator 18. This control is called a drive-by-wire scheme. As another scheme, there is a technique for controlling a throttle valve directly by an accelerator pedal that is connected to a wire 16. A throttle valve opening sensor 20 is disposed near the throttle valve 14 in order to output a signal corresponding to a throttle opening θTH.

An injector (fuel injection device) 24 is disposed for each cylinder in the periphery of an intake port immediately after an intake manifold on the downstream side of the throttle valve 14. The injector 24 is connected to a fuel tank through a fuel supply pipe and a fuel pump so as to receive gasoline fuel and inject the fuel into the intake port.

An absolute pressure sensor 32 and an intake air temperature sensor 34 are disposed downstream of the throttle valve 14 of the intake pipe 12 so as to output electric signals indicating an intake pipe internal absolute pressure PBA and an intake air temperature TA respectively.

A cylinder discriminating sensor (CYL) 40 is disposed in the periphery of a camshaft or crankshaft of the engine 10 so as to output a cylinder discriminating signal CYL at a predetermined crank angle of, for example, the first cylinder.

Additionally, a TDC sensor 42 and a crank angle sensor (CRK) 44 are provided. The former outputs a TDC signal at a predetermined crank angle position associated with a top dead center (TDC) of each cylinder. The latter outputs a CRK signal at a crank angle (for example, 30 degrees) having a shorter cycle than the TDC signal.

The engine 10 is connected to an exhaust pipe 46 through an exhaust manifold, so that the exhaust gas generated through combustion is purified by a three-way catalytic converter 51 and a NOx catalytic converter 53 and then discharged to the outside. A wide-range A/F ratio (LAF) sensor 52 is disposed upstream of the catalytic converters to output a signal that is in proportion to the oxygen density in the exhaust gas in a wide range from lean to rich. An O2 sensor 55 is disposed between the three-way catalytic converter 51 and the NOx catalytic converter 53. An output level of the O2 sensor 55 changes abruptly when it goes beyond a stoichiometric border from the lean side to the rich side or vice versa.

A re-circulating pipe 23 is connected to the exhaust pipe 46, so that a part of the exhaust gas passes through a re-circulating pipe 27 via a re-circulating valve 25 and then flows into the air intake pipe. Thus, the re-circulating valve 25 opens in response to the signal from the ECU 60. A lift sensor is disposed in the re-circulating valve 25 in order to detect an operation amount, that is, a lift amount. Its specific structure is described in the above-referenced Japanese Patent No. 3097491.

A vehicle speed sensor 54 is disposed in the vicinity of a driving shaft for driving the wheels of the vehicle so as to output a signal for every predetermined rotations of the driving shaft. Moreover, an atmospheric pressure sensor 56 is disposed in the vehicle to output a signal corresponding to the atmospheric pressure.

The outputs of these sensors are sent to the ECU 60. The ECU 60 is structured with a computer. The ECU 60 has a processor CPU 60a for performing calculations, a ROM 60b for storing a list of control programs and various data and tables, a RAM 60c for temporarily storing the calculation results by the CPU 60a and other data. The outputs of the various sensors are input to an input interface 60d of the ECU 60. The input interface 60d includes a circuit for reforming input signals to modify their voltage levels and an A/D converter for transforming the signals from analog to digital.

The CPU 60a uses a counter to count CRK signals from the crank angle sensor 44 so as to detect an engine rotational speed NE and count signals from the vehicle speed sensor 54 so as to detect a vehicle traveling speed VP. CPU 60a performs certain operations in accordance with the programs stored in the ROM 60b to send driving signals to the injector 24, an ignition device (not shown), the throttle valve actuator 18 and other elements through an output interface 60e.

Figure 2:
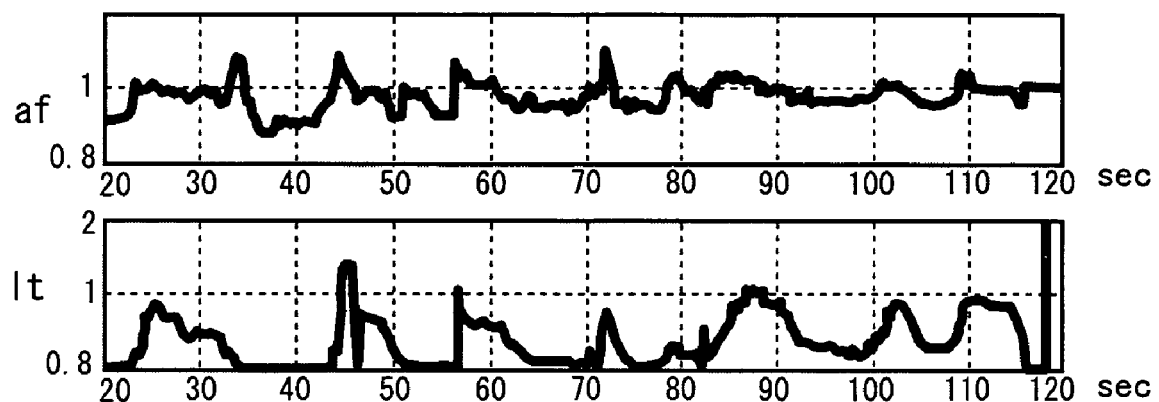
FIG. 2 graphically shows an A/F ratio correction value and a re-circulating valve lift amount when there exists no leakage in a re-circulating system.

As described above, if a crack or a disconnection occurs in the re-circulating pipes 23, 27 and the re-circulating valve 25, the air may be mixed in the re-circulating exhaust gas and accordingly the effect of the exhaust gas recirculation may decrease. The present invention aims at detecting a leakage due to such crack or disconnection in re-circulating pipes in an exhaust gas recirculation system. FIG. 2 shows a relation between an A/F ratio correction value af and a lift amount If of the re-circulating valve under such condition that no leakage exists. The horizontal axis represents time in seconds and the vertical axis represents a correction coefficient value used by an A/F ratio feedback control as for the af and a coefficient value indicating the lift amount of the circulating valve as for the If. On the other hand, FIG. 3 shows a relation between the A/F ratio correction value af and the lift amount If of the circulating valve under such condition that there exists a leakage in the recirculation system.

Figure 3:
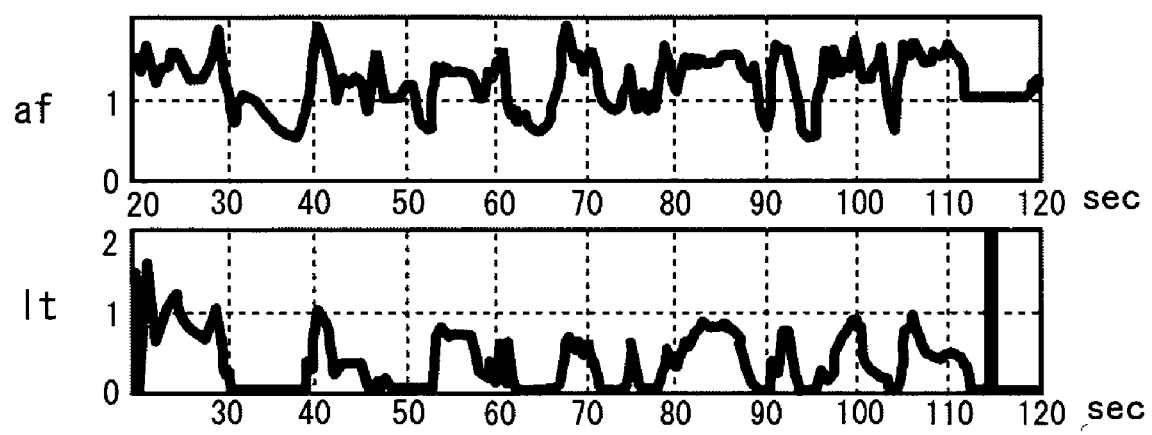
FIG. 3 graphically shows an A/F ratio correction value and a re-circulating valve lift amount when there exists a leakage in a re-circulating system.

In FIG. 2, no relationship between the af wave and the If wave is recognized, but in FIG. 3, the movement of the af wave is similar to the movement of the If wave. Although the correlation between the A/F ratio correction value af and the lift amount It of the re-circulating valve is weak under the no-leakage condition, it is stronger under the leakage condition. Under the leakage condition, as the lift amount of the re-circulating valve is increased more to increase the amount of the re-circulating exhaust gas more, the amount of the air that is mixed from the leakage portion increases more. For this reason, the air-fuel ratio becomes leaner than the desired value that is set by the A/F ratio feedback control system. Therefore, in order to achieve the desired value of the air-fuel ratio, the A/F ratio feedback control system corrects the correction value af of the air-fuel ratio. Thus, under the leakage condition, there is an interrelation between the A/F ratio correction value af and the lift amount If of the circulating valve.

It is commonly known that an inner product a*b between one vector value $a(a_0, a_1, a_2, \ldots, a_{n-1})$ and another vector value $b(b_0, b_1, b_2, \ldots, b_{n-1})$ can be expressed by the following equation:

$$a*b = |a||b| \cos \theta \qquad (1)$$

where |a| represents the magnitude of the vector a and |b| represents the magnitude of the vector b. θ indicates an angle to be formed by the two vectors a and b. Cos θ is referred to as a correlation coefficient of the two vectors "a" and "b".

According to a certain statistical method, when the correlation of the two vectors "a" and "b" is evaluated, a cosine value of an angle θ that is formed by a vector $da(da_0, da_1, da_2, \ldots, da_{n-1})$ of deviations between each element of the vector a and an average value of the elements of the vector a and a vector $db(db_0, db_1, db_2, \ldots, db_{n-1})$ of deviations between each element of the vector b and an average value of the elements of the vector b is used as a correlation coefficient. Such vectors and correlation coefficient can be expressed as in the following equations:

$$da*db = |da||db| \cos \theta \qquad (2)$$

$$\cos \theta = da*db/|da||db| \qquad (3)$$

In this embodiment of the present invention, according to such statistical method, a deviation vector $DAF(af_0-af_{ave}, af_1-af_{ave}, \ldots, af_{n-1}-af_{ave})$ for deviations of each element of a vector AF for the air-fuel ratio correction values "af" relative to a moving average value $af_{ave}$ over a predetermined period for those elements is obtained. Similarly, a deviation vector $DLT(lt_0-lt_{ave}, lt_1-lt_{ave}, \ldots, lt_{n-1}-lt_{ave})$ for deviations of each element of a vector LT for the re-circulating valve lift amounts lt relative to a moving average value $lt_{ave}$ over a predetermined period for those elements is obtained. In this embodiment, in order to reduce the calculation load, an inner product between the vectors DAF and DLT is used as an approximation of the correlation. So, this inner product can be called a pseudo correlation coefficient. Thus, the pseudo correlation coefficient r is expressed by the following equation:

$$r = DLT*DAF \qquad (4)$$

Figure 4:
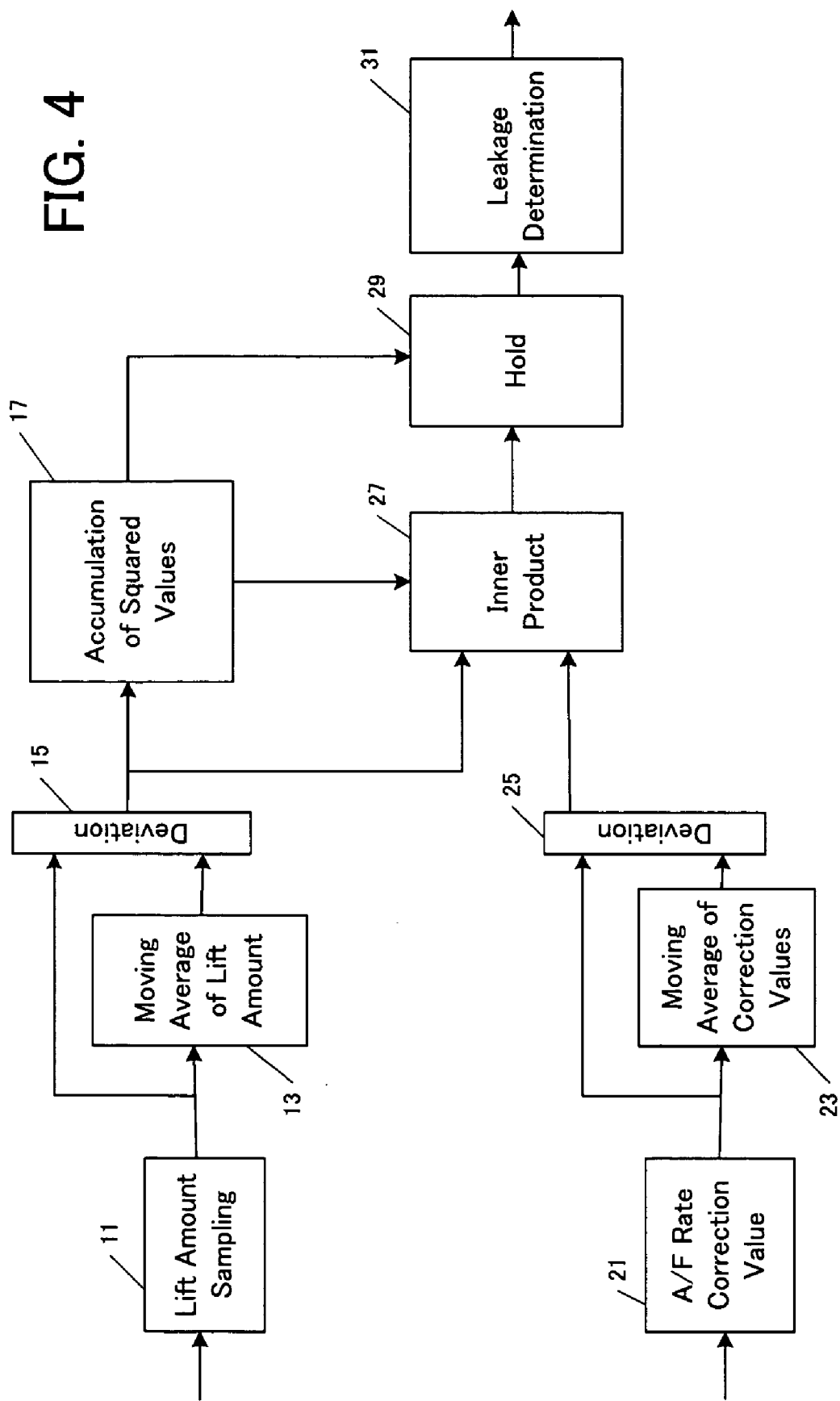
FIG. 4 is a block diagram for a leakage determining apparatus in accordance with one embodiment of the present invention.

FIG. 4 shows functional blocks of a re-circulating system leakage determining apparatus in accordance with one embodiment of the present invention. Functions of each block of this apparatus is implemented by running the program stored in the ROM 60b of the ECU 60 (FIG. 1). A lift amount sampling unit 11 takes a sample of the outputs of the lift sensor 26 that detects the re-circulating valve lift amount so as to output a sample value lt. This sampling is performed in a predetermined cycle. A lift amount moving average unit 13 calculates a moving average value for the sample values lt over a predetermined period. This period for calculating a moving average value is set to a time until a value that is calculated and accumulated by a square value accumulating unit 17 (to be described later) reaches a predetermined threshold value.

The lift amount sample values lt and the moving average value are input to a deviation calculating unit 15 to calculate the lift amount deviations dlt. The deviations dlt are input to the square value accumulating unit 17 to accumulate the square values of the deviations dlt. In other words, the square value accumulating unit 17 continuously performs the calculation expressed by the following equation:

$$S = \sum_{k=0}^{n-1} dlt_k^2 \quad (5)$$

On the other hand, an A/F ratio correction value unit 21 receives an A/F ratio correction value af that is calculated by the A/F ratio feedback control unit of the ECU 60. A correction value moving average calculating unit 23 calculates a moving average of the A/F ratio correction values over the same period as in the lift amount moving average unit 13. The A/F ratio correction values af and their moving average value are provided to a deviation calculating unit 25 to calculate deviations daf between the A/F ratio correction values af and their moving average. The deviations daf, together with the lift amount deviations dlt, are provided to an inner product calculating unit 27 to calculate an inner product. In other words, the inner product calculating unit 27 continuously calculates the following equation, for example, in every one second:

$$DLT \cdot DAFS = \sum_{k=0}^{n-1} dlt_k \cdot daf_k \quad (6)$$

These inner product calculations continue as one cycle until the accumulated value calculated by the square value accumulating unit 17 reaches a predetermined threshold value. In other words, a subscript n−1 in Equation (6) corresponds to a sample value when the output value of the square value accumulating unit 17 has reached the threshold value. The accumulation of the square values of the deviations can approximately indicate a statistical variance. In this embodiment, the period until the variance of the re-circulating valve lift amounts reaches the predetermined value is used as one cycle for the inner product calculations because such situation that the leakage determination must be changed may not happen as long as the variance is small. Alternatively, any predetermined fixed period may be used as one cycle.

The output of the inner product calculating unit 27 when the variance of the re-circulating valve lift amounts has reached the predetermined value is sent to a hold unit 29, in which the output value is held until that value is updated at the next time. When the inner product value that is held in the hold unit 29 exceeds a predetermined threshold value, a leakage determining unit 31 determines that there exists a leakage in the re-circulating system and generates a determination output. This output may be used to inform the user of a failure in the vehicle, so that the user may bring the vehicle to a service factory. Additionally, a history of the outputs may be stored in the memory, so that the history can be used at the vehicle failure diagnosis time.

Figure 5:
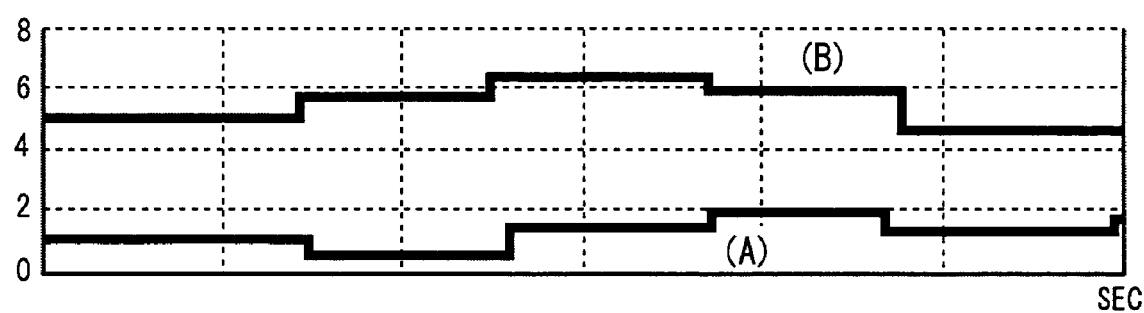
FIG. 5 shows inner product values under various conditions.

FIG. 5 shows a time-sequence change of the value that is held in the hold unit 29. The horizontal axis represents time and the vertical axis represents the inner product value (namely, the pseudo correlation coefficient). In FIG. 5, a wave (A) indicates the pseudo correlation coefficient under the no-leakage condition whereas a wave (B) indicates the inner products when a larger leakage occurs in the re-circulating system. When no leakage occurs, the pseudo correlation coefficient becomes a small value of approximately zero. When a leakage exists, it is observed that the pseudo correlation coefficient takes a value of 2 to 7 in accordance with the degree of the leakage.

When the value of the pseudo correlation coefficient exceeds a predetermined threshold value, for example 2.0 or 3.0, the leakage determining unit 31 determines that there exists a leakage in the re-circulating system.

While the invention has been described with respect to specific embodiments, the scope of the invention is not limited to such embodiments.

What is claimed is:

1. A leakage detecting apparatus for an internal-combustion engine having a re-circulating passage for re-circulating an exhaust gas from an exhaust system to an air intake system in the engine, a re-circulating valve that is disposed in the re-circulating passage to control a flow rate of the re-circulating exhaust gas, and an A/F ratio sensor for detecting an A/F ratio of the exhaust system, said apparatus comprising:

a first means for detecting an operation amount of the re-circulating valve; and a second means for calculating correlation between output of the operation amount detecting means and output of the A/F ratio sensor to determine leakage in the re-circulating passage, wherein the correlation is obtained by an inner product calculation of deviations of time-sequence vector of the output of said first means relative to an average value and deviations of a time-sequence vector of the output of the A/F ratio sensor relative to an average value, and wherein leakage in the re-circulating passage is detected when an accumulated value of the inner product over a predetermined period exceeds a threshold value.

2. The leakage detecting apparatus as claimed in claim 1, wherein the predetermined period is a period until a sum of squared values of the deviations as an index for a variance of the time-sequence vector of the outputs from the operation value detecting means reaches a predetermined value.

3. A method for detecting leakage in a re-circulating passage of an exhaust gas in an internal-combustion engine having a re-circulating valve disposed in the re-circulating passage for controlling flow rate of the re-circulating exhaust gas, and an A/F ratio sensor for detecting an A/F ratio of the exhaust system, said method comprising:

detecting an operation amount of the re-circulating valve and providing output indicating the operation amount;

calculating a correlation between said output indicating the operation amount and output of the A/F ratio sensor to determine a leakage in the re-circulating passage;

calculating an inner product of a vector of deviations of time-sequence vector of the output indicating the operation amount relative to a moving average and a vector of deviations of a time-sequence vector of the outputs of the A/F ratio sensor relative to a moving average: and detecting leakage in the recirculation passage when accumulated value of the inner product over a predetermined period exceeds a threshold value.

4. A computer program for performing a method of detecting leakage in a re-circulating passage of an exhaust gas in an internal-combustion engine having a re-circulating valve disposed in the re-circulating passage for controlling flow rate of the re-circulating exhaust gas, and an A/F ratio sensor for detecting an A/F ratio of the exhaust system, said computer program, when executed on an electronic control unit, performing:

detecting an operation amount of the re-circulating valve and providing output indicating the operation amount;

calculating a correlation between said output indicating the operation amount and output of the A/F ratio sensor to determine a leakage in the re-circulating passage;

calculating an inner product of a vector of deviations of time-sequence vector of the output indicating the operation amount relative to a moving average and a vector of deviations of a time-sequence vector of the outputs of the A/F ratio sensor relative to a moving average; and detecting leakage in the recirculation passage when accumulated value of the inner product over a predetermined period exceeds a threshold value.

* * * * *